(12) United States Patent
Fernandes

(10) Patent No.: US 7,852,941 B2
(45) Date of Patent: *Dec. 14, 2010

(54) TRANSCODERS AND METHODS

(75) Inventor: Felix C. Fernandes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/166,456

(22) Filed: Jul. 2, 2008

(65) Prior Publication Data

US 2008/0267294 A1 Oct. 30, 2008

Related U.S. Application Data

(63) Continuation of application No. 10/666,981, filed on Sep. 17, 2003, now Pat. No. 7,412,003.

(51) Int. Cl.
*H04B 1/66* (2006.01)

(52) U.S. Cl. ............... 375/240.16; 375/240.25; 375/240.26; 375/240.24; 375/240.2; 375/240.12; 382/233; 382/235; 382/238; 382/250; 382/236

(58) Field of Classification Search ............ 375/240.16, 375/240.25, 240.26, 240.24, 240.2, 240.12; 382/233, 235, 238, 250, 236
See application file for complete search history.

(56) References Cited

U.S. PATENT DOCUMENTS

| | | | | |
|---|---|---|---|---|
| 6,931,064 B2 * | 8/2005 | Mori et al. | ............. | 375/240.16 |
| 6,999,512 B2 * | 2/2006 | Yoo et al. | ............. | 375/240.03 |
| 7,203,237 B2 * | 4/2007 | Fernandes | ............. | 375/240.16 |

* cited by examiner

*Primary Examiner*—Shawn An
(74) *Attorney, Agent, or Firm*—Mima Abyad; Wade J. Brady, III; Frederick J. Telecky, Jr.

(57) ABSTRACT

Transcoding as from MPEG-2 SDTV to MPEG-4 CIF reuses motion vectors and downsamples in the frequency (DCT) domain with differing treatments of frame-DCT and field-DCT blocks, and alternatively uses de-interlacing IDCT with respect to the row dimension plus deferred column downsampling for reference frame blocks.

10 Claims, 6 Drawing Sheets

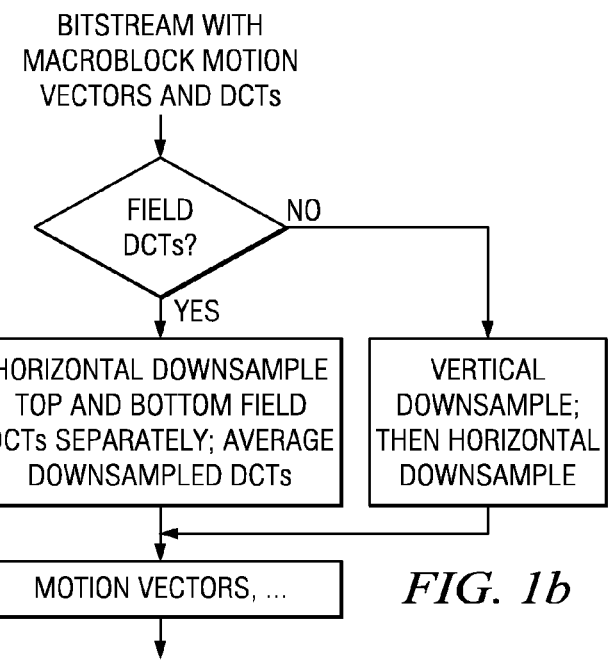
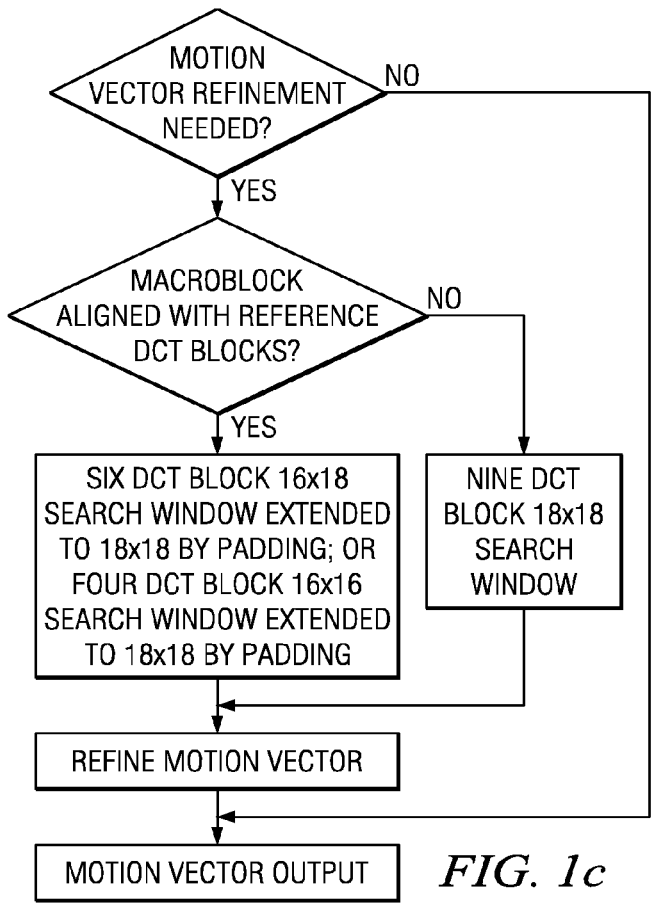

TRANSCODERS AND METHODS

CROSS-REFERENCE TO RELATED APPLICATIONS

The following US patent application is a continuation application of U.S. application Ser. No. 10/666,981 filed Sep. 17, 2003, which is herein incorporated by reference. The following US patent application discloses related subject matter to U.S. application Ser. Nos. 09/089,290, 10/664,227 (now U.S. Pat. No. 7,203,237), 10/664,240, 10/666,965 and 10/667,063. All of these referenced applications have a common assignee with the present application.

BACKGROUND OF THE INVENTION

The present invention relates to digital video image processing, and more particularly, to methods and systems for transcoding from one video format to another with differing resolution.

Currently, a large body of video content exists as MPEG-2 encoded bitstreams ready for DVD or broadcast distribution. This MPEG-2 content is usually available at a high bitrate (e.g., 6 Mbps), in interlaced SDTV (standard definition television) format (704×480 pixels). However, for effective video transmission, many applications such as 3G wireless infrastructure, video streaming, home networking, et cetera use low bitrate, progressive standards such as MPEG-4 or H.263. Due to the potential high-volume market associated with these applications, video transcoding which can convert MPEG-2 bitstreams into MPEG-4 bitstreams is an important, emerging technology.

FIG. 2a shows generic DCT-based motion-compensated encoding which is used in MPEG-2 and MPEG-4. FIG. 2b illustrates a straightforward, but computationally intensive, resolution-reducing transcoder for conversion of an MPEG-2 bitstream into a lower-resolution MPEG-4 bitstream; the first row of operations decodes the input MPEG-2 bitstream, the middle operation down-samples the reconstructed video frames by a factor of two in both vertical and horizontal dimensions, and the bottom row performs MPEG-4 encoding. In particular, the input MPEG-2 SDTV bitstream is decoded by a conventional decoder that performs Variable-Length Decoding (VLD), Inverse Quantization (IQ), Inverse Discrete Cosine Transform (IDCT), and Motion Compensation (MC) to produce SDTV-resolution raw frames in the 4:2:0 format. Spatial down-sampling by a factor of two is then performed vertically and horizontally to produce raw frames. Spatial downsampling along the vertical dimension is performed by extracting the top field of the raw interlaced SDTV frame. Spatial downsampling along the horizontal dimension is subsequently implemented either by discarding odd-indexed pixels or by filtering horizontally with the [1; 1] kernel and then discarding the odd-indexed pixels. This spatial downsampling yields raw frames at the resolution 352×240. These frames are converted to CIF resolution by appending a 352×48 block of zeros to each raw frame. Next, the CIF-resolution raw frames are input to an MPEG-4 encoder that performs Motion Estimation (ME), Discrete Cosine Transform (DCT), Quantization (Q) and Variable-Length Coding (VLC) to obtain the transcoded MPEG-4 CIF bitstream.

However, because the CIF-resolution frames are obtained from down-sampling the SDTV-resolution frames, the motion field described by the MPEG-4 motion vectors is a downsampled version of the motion field described by the MPEG-2 motion vectors. This implies that the ME stage may be eliminated in FIG. 2b because MPEG-2 motion vectors may be re-used in the MPEG-4 encoder, as suggested in FIG. 3a. In fact, if the ME utilizes an exhaustive search to determine the motion vectors, then it consumes approximately 70% of the MPEG-4 encoder cycles. In this case, elimination of the ME stage by estimating the MPEG-4 motion vectors from the MPEG-2 motion vectors will significantly improve transcoding performance.

Now, every MPEG-2 frame is divided into 16×16 MacroBlocks (MBs) with the 16×16 luminance pixels subdivided into four 8×8 blocks and the chrominance pixels, depending upon format, subsampled as one, two, or four 8×8 blocks; the DCT is performed on 8×8 blocks. Each macroblock is either intra- or inter-coded. The spatial downsampler of FIG. 3a converts a "quartet" of four MBs that are co-located as shown in FIG. 3b into a single 16×16 Macroblock that will be MPEG-4 encoded. Each inter-coded MB is associated with a motion vector that locates the reference macroblock in a preceding anchor-frame. Therefore, every MB quartet has four associated MPEG-2 motion vectors as shown in FIG. 3c. And the prediction errors from use of the reference macroblock as the predictor is DCT transformed; for luminance either as four 8×8 blocks according to spatial location (frame-DCT) or as four 8×8 blocks with two 8×8 blocks corresponding to the top field of the MB and two 8×8 blocks corresponding to the bottom field of the MB (field-DCT).

To eliminate the MPEG-4 ME stage in the FIG. 2b baseline transcoder, estimate the MPEG-4 motion vector from the four associated MPEG-2 motion vectors, as shown in FIG. 3c. (Note that in B-frames, an MB may also have an additional motion vector to locate a reference macroblock in a subsequent anchor-frame.) And various motion vector estimation approaches have been proposed; for example, Wee et al., Field-to-frame transcoding with spatial and temporal down-sampling, IEEE Proc. Int. Conf. Image Processing 271 (1999) estimate the MPEG-4 motion-vector by testing each of the four scaled MPEG-2 motion vectors associated with a macroblock quartet on the decoded, downsampled frame that is being encoded by the MPEG-4 encoder. The tested motion vector that produces the least residual energy is selected as the estimated MPEG-4 motion vector.

For the transcoder in FIG. 3a, the input and output bitstreams are both coded, quantized DCT coefficients. However, after the IDCT stage, spatial-domain processing accounts for most of the intermediate processing. Finally, the DCT stage returns the spatial-domain pixels to the frequency-domain for quantization and VLC processing. Some researchers suggested that the intermediate processing can be performed in the frequency domain, thus eliminating the IDCT and DCT stages in the transcoder. For example, Assuncao et al, A Frequency-Domain Video Transcoder for Dynamic Bit-Rate Reduction of MPEG-2 Bit Streams, 8 IEEE Trans. Cir. Sys. Video Tech. 953 (1998).

And Merhav et al, Fast Algorithms for DCT-Domain Image Down-Sampling and for Inverse Motion Compensation, 7 IEEE Tran. Cir. Sys. Video Tech. 468 (1997), provides matrices for downsampling and inverse motion compensation in the frequency domain together factoring of the matrices for fast computations.

Further, Song et al, A Fast Algorithm for DCT-Domain Inverse Motion Compensation Based on Shared Information in a Macroblock, 10 IEEE Trans. Cir. Sys. Video Tech 767 (2000), disclose inverse motion compensation taking advantage of the adjacent locations of the four reference 8×8 blocks of a predicted macroblock to simplify the computations.

Subsequently, Liu et al, Local Bandwidth Constrained Fast Inverse Motion Compensation for DCT-Domain Video Transcoding, 12 IEEE Tran. Cir. Sys. Video Tech. 309 (2002)

and A Fast and Memory Efficient Video Transcoder for Low Bit Rate Wireless Communications, IEEE Proc. Int. Conf. ASSP 1969 (2002), demonstrated reduced-complexity frequency-domain transcoding by downsampling prior to inverse motion compensation in the frequency domain.

Arai et al, A Fast DCT-SQ Scheme for Images, 71 Trans. IEICE 1095 (1988), provides a factorization for the 8×8 DCT matrix which allows for fast computations.

Hou, A Fast Recursive Algorithm for Computing the Discrete Cosine Transform, 35 IEEE Tran. ASSP 1455 (1987), provides a recursive method for the DCT analogous to the fast Fourier transform (FFT) in which a 2N-point transform is expressed in terms of N-point transforms together with simple operations.

SUMMARY OF THE INVENTION

The present inventions provide resolution-reducing transcoding methods including motion vector reuse by best predictor selection, motion vector refinement by search window adaptation to reference block boundary alignment, frequency domain downsampling with frame-DCT blocks spatially averaged but field-DCT blocks spatially averaged only horizontally and the field averaged, and mixtures of one-dimensional de-interlacing IDCT with IDCT plus downsampling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1a-1d are flow diagrams.

FIGS. 3a-3d illustrate a transcoder and motion vector estimation.

DESCRIPTION OF THE PREFERRED EMBODIMENTS

1. Overview

Figure 1D:
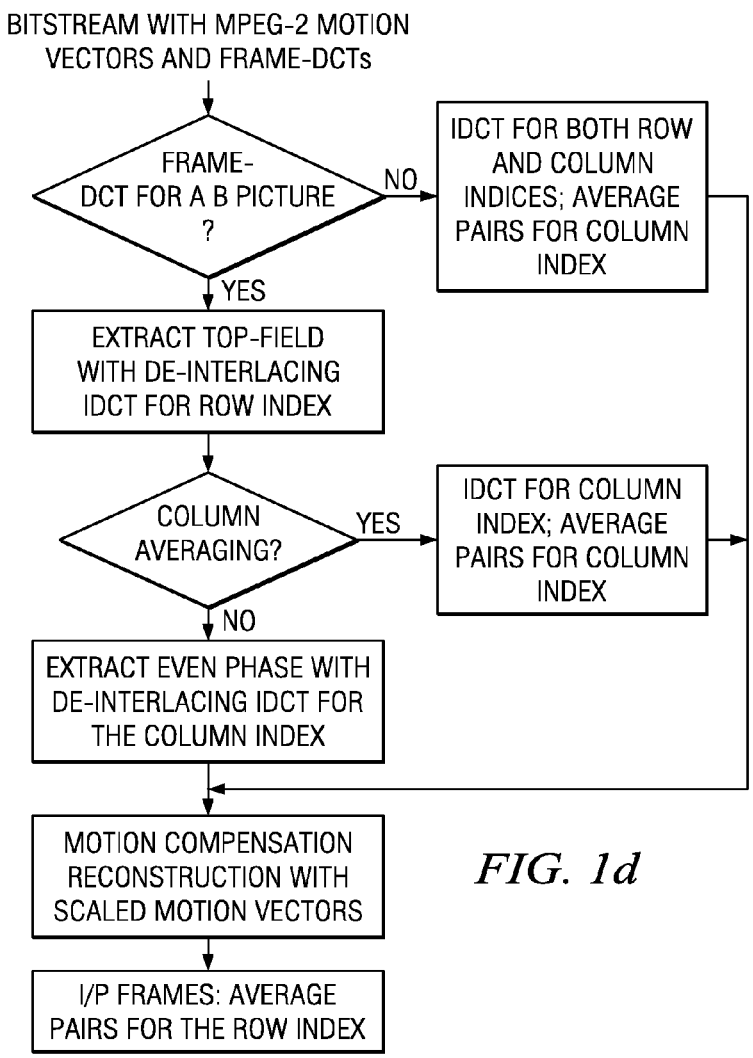

The preferred embodiment methods and systems convert MPEG-2 bitstreams into MPEG-4 bitstreams with spatial-resolution reduction by downsampling. The methods include re-use of motion vectors for downsampled blocks by scaling the best predictor of four motion vectors prior to downsampling, refinement of motion vector estimates in the frequency domain by search windows which adapt to target and reference block boundary alignment, B-picture and I-/P-picture separate downsampling methods, and mixture of de-interlacing one-dimensional (1-D) inverse DCT (IDCT) and 1-D IDCT plus downsampling together with inverse motion compensation after horizontal downsampling but prior to vertical downsampling in order to minimize drift.

2. Motion Vector Estimation

To describe the preferred embodiment motion vector estimation for transcoding MPEG-2 to MPEG-4, first briefly consider following five prior art approaches:

(1) random motion-vector estimation: The simplest motion-vector estimation algorithm for downsampled frames is the random algorithm proposed by Shanableh et al, Heterogeneous Video Transcoding to Lower Spatio-Temporal Resolutions and Different Encoding Formats, 2 IEEE Trans. On Multimedia 1927 (2000). To obtain the MPEG-4 estimate, the algorithm randomly selects one of the four MPEG-2 motion vectors in FIG. 3c and then halves its horizontal and vertical components. This scaling of the motion-vector components is done to account for the spatial-resolution difference between the MPEG-2 frame and the MPEG-4 frame. If a processor clock is used to select a random number, then the random motion-vector estimation algorithm has a very low cycle count.

(2) average motion-vector estimation: Shen et al., Adaptive Motion-Vector Resampling for Compressed Video Downscaling, 9 IEEE Trans. Cir. Sys. Video Tech. 929 (1999) and Shanableh et al, supra, proposed that the MPEG-4 motion-vector estimate may be obtained by separate averaging of the horizontal and vertical components of the four MPEG-2 motion vectors. The averaged motion vector is then scaled to account for the spatial-resolution reduction. This algorithm consumes 6 adds and 2 shifts.

(3) weighted-average motion-vector estimation: Shen et al., supra, and Yin et al. Video Transcoding by Reducing Spatial Resolution, IEEE Proc. Int. Conf. Image Processing 972 (2000) showed that the performance of the average motion vector estimation algorithm may be improved by adaptively weighting the average so as to move the estimate toward motion vectors associated with MBs containing edges. The cycle count for this algorithm is 76 adds and two shifts, assuming that 25% of the DCT terms in the four MPEG-2 macroblocks are non-zero.

(4) median motion-vector estimation: Shanableh et al, supra, demonstrated that the median of the four MPEG-2 motion vectors may be used as the MPEG-4 motion vector estimate. The median is obtained by first calculating the distance between each MPEG-2 motion vector and the rest. Next, the median motion vector is defined as the vector that has the least distance from the others. Finally, the median motion vector is scaled to obtain the MPEG-4motion-vector estimate. The median motion-vector estimation algorithm requires 30 adds, 12 multiplies, two shifts and three comparisons.

(5) minimum-norm motion-vector estimation: Wee et al., cited in the background, estimate the MPEG-4 motion-vector by testing each of the four scaled MPEG-2 motion vectors associated with a macroblock quartet on the decoded, downsampled frame which is being encoded by the MPEG-4 encoder. The tested motion vector that produces the least residual energy is selected as the estimated MPEG-4 motion vector. The cycle count for this algorithm is 256 adds, three comparisons and two shifts.

The first preferred embodiment motion vector estimation method is a fast minimum-norm motion-vector estimation which may be used in transcoders that reduce the output bitrate by discarding B-frames as in Wee et al. As shown in FIGS. 3b-3c, for a quartet of MPEG-2 macroblocks there are four MPEG-2 motion vectors, one motion vector is associated with each MPEG-2 macroblock. For each of these four macroblocks, compute the sum of squares of all (non-zero) entries in the corresponding DCT residual blocks (recall DCT is on 8×8 blocks). This quantity is the squared/norm of the residual block; and for P-frame macroblocks, this norm serves as a figure of merit for the motion vector associated with the macroblock. Indeed, a small $l^2$ norm indicates low residual energy which, in turn, implies that the associated motion vector points to a reference block that is an effective predictor for the macroblock. Next, select among these four MPEG-2 motion vectors the one associated with the macroblock having the smallest $l^2$ norm. Then halve this motion vector to account for the downsampling resolution reduction, and use the thus-scaled motion vector as the estimate for the MPEG-4 motion vector; see FIG. 1a. Note that the $l^2$ norms may be estimated quickly because there typically are few non-zero entries in the DCT residual blocks due to quantization; and these entries are made explicit during the MPEG-2 decoder's VLD operation. This preferred embodiment method of motion vector estimation consumes 64 adds, three comparisons and two shifts, assuming that 25% of the DCT terms in the four MPEG-2 residual MBs are non-zero.

In more mathematical terms the foregoing can be described as follows. First, presume the four macroblocks $x_1, x_2, x_3, x_4$ form a 2×2 quartet of macroblocks and were MPEG-2 compressed to yield the four motion vectors $v_1, v_2, v_3, v_4$, together with the corresponding quantized 8×8 DCTs; the number of DCTs depends upon the macroblock format: six for 4:2:0, eight for 4:2:2, or twelve for 4:4:4. For each n the motion vector $v_n$ was determined by searching to minimize the prediction error, $e_n$, of the 16×16 luminance part, $y_n$, of macroblock $x_n$. That is, the motion vector $v_n$ locates the predicted 16×16 luminance block $\hat{y}_n$ from the prior reconstructed reference frame which minimizes the 16×16 prediction error $e_n = y_n - \hat{y}_n$. Now, for each n, the 16×16 $e_n$ can be viewed as a 2×2 array of 8×8 prediction errors: $e_{n,1}, e_{n,2}, e_{n,3}, e_{n,4}$; and the corresponding quantized 8×8 DCTs, $E_{n,1}, E_{n,2}, E_{n,3}, E_{n,4}$, are four of the 8×8 DCTs that were generated by the MPEG-2 motion compensation and compression.

Next, downsample the quartet of (reconstructed) macroblocks, $x_1, x_2, x_3, x_4$, by a factor of 2 in each dimension to yield a single macroblock x which is to be MPEG-4 compressed. Preferably, the downsampling occurs in the frequency domain. The MPEG-4 compression includes finding a motion vector, v, for x which locates a 16×16 luminance prediction y from a prior reconstructed reference frame.

The preferred embodiment method estimates this motion vector v by the following steps.

(i) Compute the four squared norms $\|E_1\|^2, \|E_2\|^2, \|E_3\|^2, \|E_4\|^2$ where $\|E_n\|^2 = \|E_{n,1}\|^2 + \|E_{n,2}\|^2 + \|E_{n,3}\|^2 + \|E_{n,4}\|^2$ with $\|E_{n,k}\|^2 = \sum_{0 \leq i,j \leq 7} E_{n,k;i,j}^2$ the sum of squares of the 64 elements of $E_{n,k}$. Due to quantization, a large number of the 64 elements vanish.

(ii) Pick n so that $\|E_n\|^2$ is the smallest of the four squared norms from step (i).

(iii) Estimate the motion vector v by $v_n/2$ where n was determined in step (ii). Thus when $v_n$ has half-pixel accuracy, v will have quarter-pixel accuracy. Of course, fractional-pixel motion vectors corresponds to a prediction block resulting from linear interpolation of the closest integer-pixel motion vector located blocks.

Note that the $E_{n,k}$ and the $v_n$ are available from the input MPEG-2 compression of the quartet of macroblocks, so the computations have low complexity.

Of course, the chrominance parts of a macroblock use the motion vector derived from the luminance part, so there is no further motion vector to estimate. Also, field rather than frame compression may generate two motion vectors, but treat each field motion vector as in the foregoing. And if one (or more) of the quartet of macroblocks is skipped or not encoded, then its corresponding $E_n$ will be all 0s and have the smallest squared norm in step (ii); thus the computation of step (i) can be skipped. Lastly, B-pictures have been omitted to reduce bitrate, but the same preferred embodiment methods could apply to the motion vectors for B-pictures.

Variations of the preferred embodiment motion vector estimation methods include use of a different magnitude measure in place of the squared norm to measure the magnitude of the DCT of the prediction errors, such as $l^p$ norms, although the DCT is not an isometry with respect to such norms for $p \neq 2$. Further, N×N arrays of macroblocks for downsampling by a factor of N in each dimension could be used with N greater than 2; and then the minimum-norm motion vector components are divided by N. FIG. 1a illustrates the methods.

3. Motion Vector Estimation Experimental Results

Figure 2A:
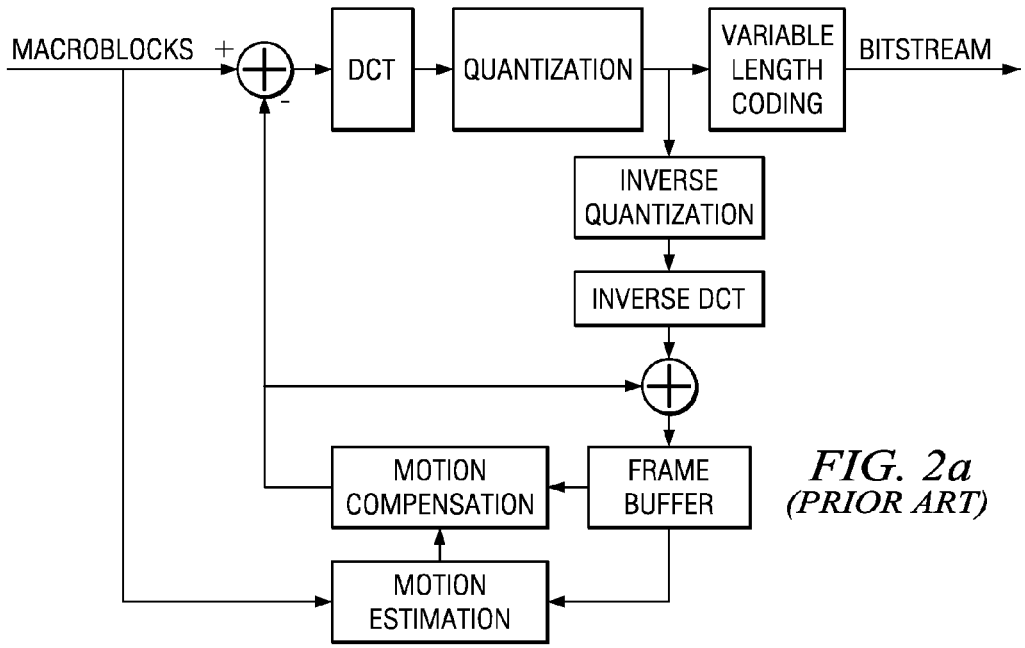
FIGS. 2a-2b show motion compensation encoding and a transcoder.
Figure 2B:
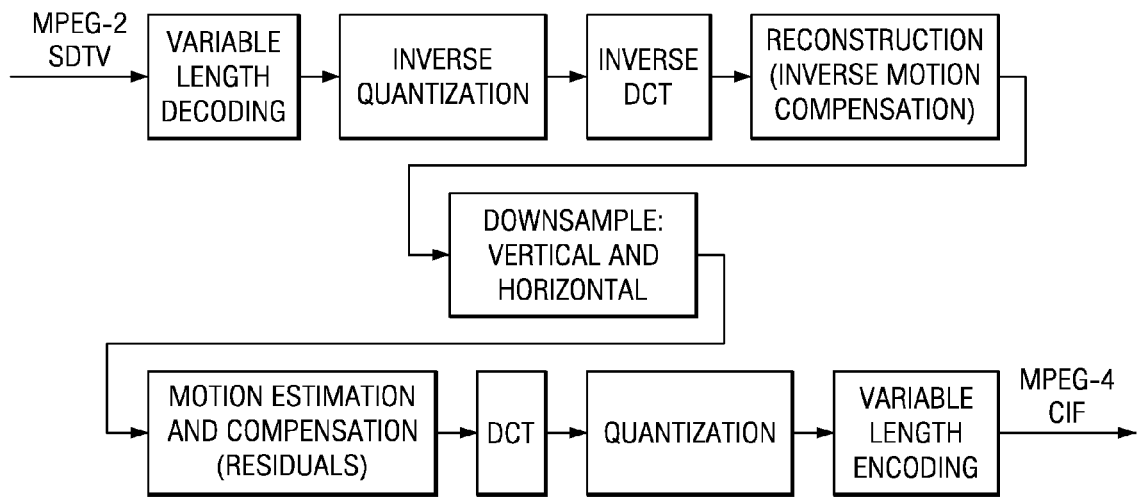
Figure 3A:
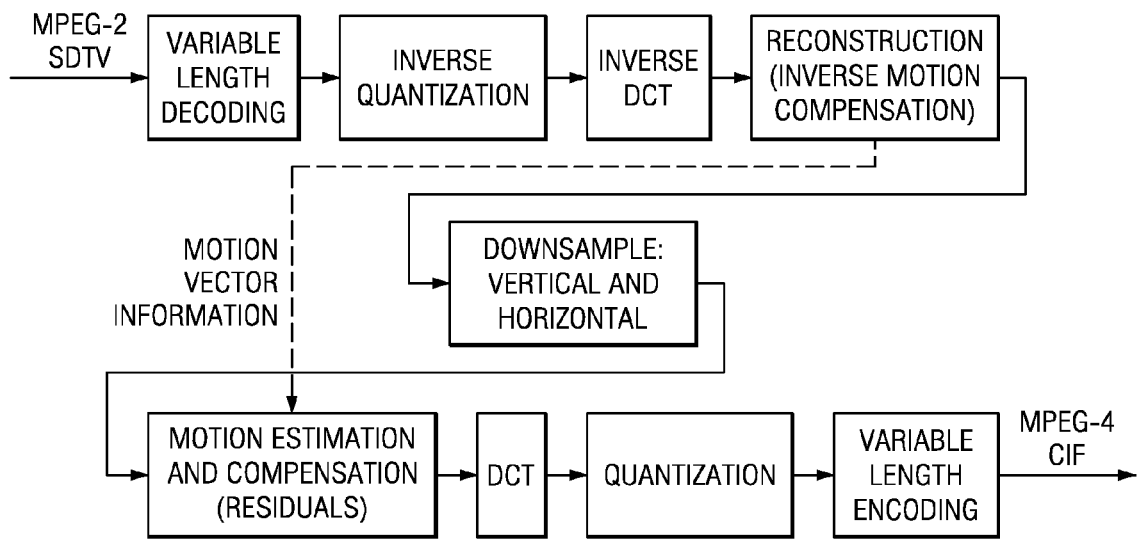
Figure 3B:
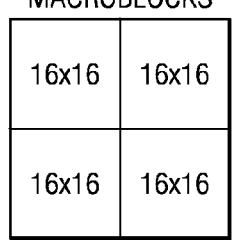

To compare the performance of the preferred embodiment motion vector estimation with the various other motion-vector estimation methods, each of the methods was used in the transcoder of FIG. 3a. Then the PSNR-loss/frame between the transcoded frames with estimated motion vectors and the downsampled output in the baseline transcoder of FIG. 2b was evaluated. The average PSNR-loss per frame (in dB) for the methods were as follows.

| | |
|---|---|
| Random | 5.62 |
| Average | 8.21 |
| Weighted average | 7.46 |
| Median | 1.34 |
| Minimum norm | 0 |
| Preferred embodiment | 0.58 |

The median, minimum-norm and preferred embodiment methods have acceptable performance. Based on the cycle counts provided for the methods, order these three algorithms from lowest to highest computational complexity as follows: median<preferred embodiment<minimum-norm. Because the minimum norm method has very high computational complexity, the median and the preferred embodiment motion-vector estimation methods provide the best performance with a trade-off of low complexity (median) for accuracy (preferred embodiment).

4. Frequency-Domain Transcoding

FIG. 3a shows the transcoder input and output bitstreams are coded, quantized DCT coefficients. However, after the IDCT stage, spatial-domain processing accounts for most of the intermediate processing. Finally, the DCT stage returns the spatial-domain pixels to the frequency domain (DCT domain) for quantization and VLC processing. Prior researchers such as Chang et al, Manipulation and Compositing of MC-DCT Compressed Video, 13 IEEE J. Sel. Areas Comm. 1 (1995), Assuncao et al, Transcoding of MPEG-2 Video in the Frequency-Domain, IEEE Proc. Int. Conf. ASSP 2633 (1997), and Merhav et al, cited in the background, suggested that the intermediate processing can be performed in the frequency domain, thus eliminating the IDCT and DCT stages in the transcoder, and the preferred embodiments extend such methods. Thus first consider these prior frequency-domain transcoding methods.

Chang et al, Manipulation and Compositing of MC-DCT Compressed Video, 13 IEEE J. Sel. Areas Comm. 1 (1995), showed that motion compensation can be performed in the frequency domain (DCT-domain). Their algorithm was improved upon by Merhav et al and Assuncao et al, both cited in the background, who showed in addition that frequency domain motion compensation may be used in a frequency-domain transcoder. However, unlike the baseline transcoder in FIG. 2b, the transcoder of Assuncao et al provided bitrate reduction but did not perform a spatial-resolution reduction. Subsequently, Lin et al, Fast Algorithms for DCT-Domain Video Transcoding, IEEE Proc. Int. Conf. Image Processing 421 (2001), used partial low-frequency extraction to reduce the computational complexity of the transcoder of Assuncao et al.

Figure 4A:
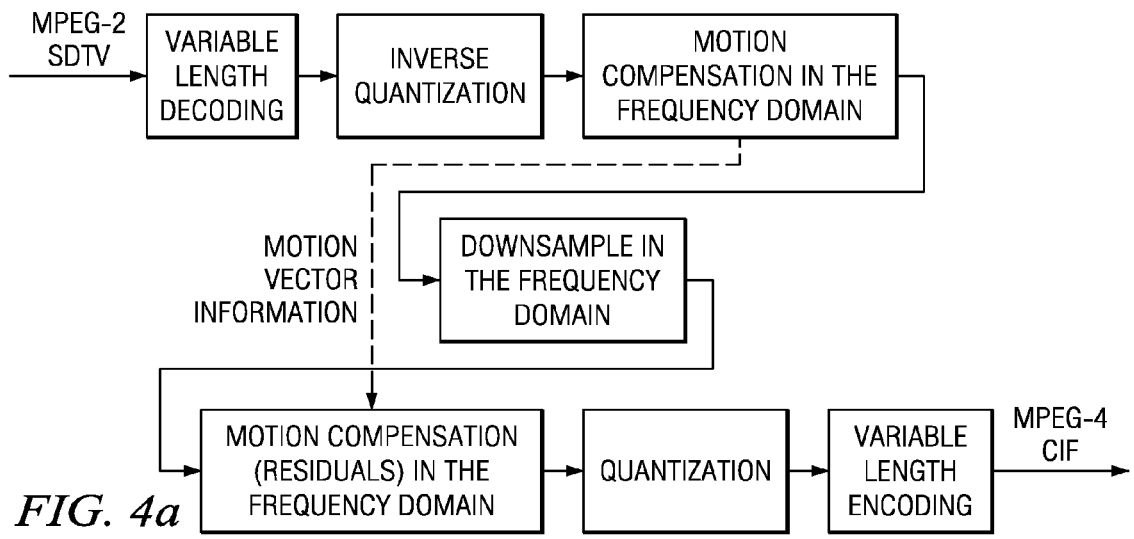
FIGS. 4a-4b show transcoders.

Natarajan et al, A Fast Approximate Algorithm for Scaling Down Digital Images in the DCT Domain, IEEE Proc. Int. Conf. Image Processing 241 (1995), proposed a fast algorithm for spatial resolution reduction in the DCT domain. This algorithm can be used to modify the transcoder of Assuncao et al as shown in FIG. 4a to obtain a frequency domain transcoder with spatial-resolution reduction. In FIG. 4a the top row of operations is MPEG-2 processing and the bottom row of operations is MPEG-4 processing. The MC stage implements frequency-domain motion compensation, and the Downsample stage performs spatial-resolution reduction in the frequency domain. However, this approach to frequency-domain transcoding wastes computational cycles because the MPEG-2 decoder performs a computationally expensive MC operation at the high SDTV resolution.

Instead, based on the observation of Mokry et al, Minimal Error Drift in Frequency Scalability for Motion—Compensated DCT Coding, 4 IEEE Tran. Cir. Sys. Video Tech. 302 (1994), that the MC and Downsample stages are interchangeable, Vetro et al. Minimum Drift Architectures for 3-Layer Scalable DTV Decoding, 44 IEEE Cons. Elec. 527 (1998), suggested the transcoding scheme shown in FIG. 4b, again with the top row of operations for MPEG-2 processing and the bottom row of operations MPEG-4 processing. In this frequency-domain transcoder, the frequency domain frames are downsampled to the low CIF resolution and then motion compensated in the DCT domain. Because the computationally expensive MC stage is performed at the lower CIF resolution, the computational complexity is significantly reduced. Two separate MC stages are required because the decoder and encoder have different frame formats: the MPEG-4 encoder supports only I- and P-frames, but the MPEG-2 decoder also uses B-frames. Subsequently, Vetro et al., Generalized Motion Compensation for Drift Minimization, SPIE Conf. Vis. Comm. Image Processing (vol. 3309 1998), Yin et al, Drift Compensation Architectures and Techniques for Reduced Resolution Transcoding, SPIE Conf. Vis. Comm. Image Processing (vol. 4671, 2002), and Shen et al, A Very Fast Video Spatial Resolution Reduction Transcoder, IEEE Proc. Int. Conf. ASSP 1989 (2002), proposed variants of the frequency-domain transcoder depicted in FIG. 4b. However, these methods are computationally complex because the downsampled I/P-frames are upsampled before motion compensation to reduce drift.

Subsequently, Liu et al, cited in the background, demonstrated reduced-complexity frequency-domain transcoding also of the FIG. 4b type. Although the transcoder of Liu et al is 50% more memory efficient and 70% less computationally complex than other approaches, it has two significant disadvantages: (1) the frequency domain motion-compensation method uses an 800 Kb lookup table that is impractical for DSP implementation, and (2) only progressive prediction formats are decoded efficiently; field prediction is computationally expensive.

Figure 4B:
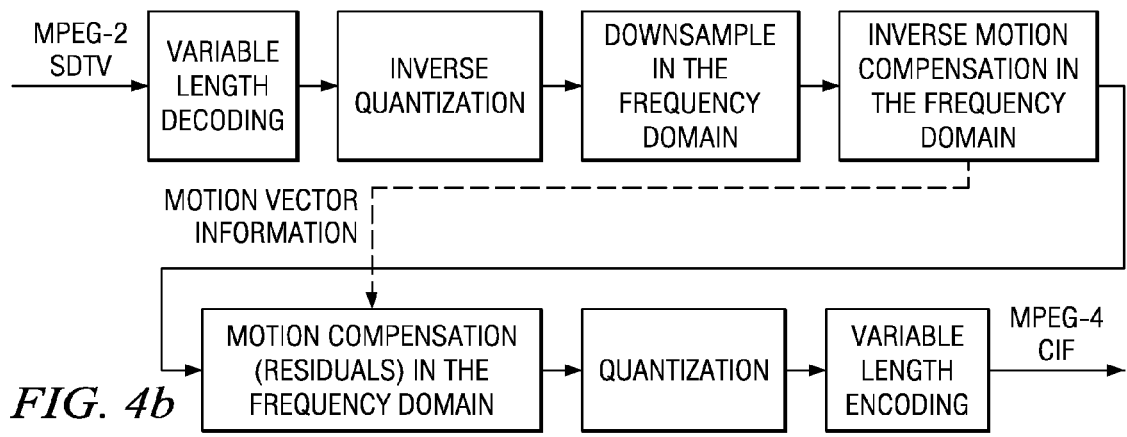

The first preferred embodiment frequency-domain transcoding methods also use a FIG. 4b type transcoder with input an MPEG-2 bitstream and VLD, IQ, and frequency domain downsampling followed by frequency domain inverse motion compensation (reconstruction) to convert all inter blocks to intra blocks. The intra frames are then encoded by a frequency domain MPEG-4 encoder that outputs the transcoded MPEG-4 bitstream. And to overcome drawbacks (1)-(2) of the transcoder of Liu et al, the preferred embodiment methods (1) use a macroblock shared information method similar to the Song et al method cited in the background and (2) have separate frame/field prediction approaches as illustrated in FIG. 1b.

In particular, for the first preferred embodiment frequency domain downsampling methods frame-DCT block downsampling differs from field-DCT block downsampling. For frame-DCT blocks, downsample the blocks in the frequency domain similar to Merhav et al, cited in the background. This method performs vertical downsampling by a frequency-domain operation that is equivalent to spatial averaging of the top and bottom fields of each block. Horizontal downsampling is achieved by a frequency-domain operator that averages the spatial-domain even- and odd-polyphase components of each row.

For field-DCT blocks, the top and bottom field DCT blocks are provided separately in MPEG-2. So first downsample horizontally separately for the DCT blocks of the top- and bottom-fields again with a method similar to that of Merhav et al, cited in the background. Next, downsample vertically by averaging the horizontally-downsampled top- and bottom-field DCT blocks. Applying different downsampling operators to the frame-DCT and field-DCT blocks yields a frequency domain downsampling method that efficiently computes the DCT of the field-averaged, horizontal polyphase-component averaged input. Since top and bottom fields of interlaced video are highly correlated, the field-averaged DCT blocks may be used for frame-prediction as well as for field-prediction. Experiments show that very few noticeable artifacts arise after performing motion compensation on the field-averaged DCT blocks. These artifacts occur in the field-predicted blocks that have top- and bottom-fields that differ significantly. To prevent the propagation of any such artifacts in the encoder, the preferred embodiment methods may store the location of field-predicted blocks. During the encoder's mode-decision stage, blocks with motion vectors pointing to field-predicted blocks are coded as intra blocks. This prevents any artifacts in field-predicted blocks from propagating to subsequent frames. This method of preventing artifact propagation is a simplified implementation of Vetro et al.'s intra-refresh technique.

For a more explicit version of the foregoing, again presume the four inter-coded macroblocks $x_1$, $x_2$, $x_3$, $x_4$ form a 2×2 quartet of macroblocks and were MPEG-2 compressed to yield the four motion vectors $v_1$, $v_2$, $v_3$, $v_4$ together with the corresponding quantized 8×8 DCTs; the number of DCTs depends upon the macroblock format: six for 4:2:0, eight for 4:2:2, or twelve for 4:4:4. For each n the motion vector $v_n$ was determined by searching to minimize the prediction error, $e_n$, of the 16×16 luminance part, $y_n$, of macroblock $x_n$. That is, the motion vector $v_n$ locates the predicted 16×16 luminance block $\hat{y}_n$ from the prior reconstructed reference frame which minimizes the 16×16 prediction error $e_n = y_n - \hat{y}_n$. Now, each 16×16 $e_n$ can be viewed as a quartet of 8×8 prediction errors: $e_{n,1}$, $e_{n,2}$, $e_{n,3}$, $e_{n,4}$; and the corresponding quantized 8×8 DCT blocks, $E_{n,1}$, $E_{n,2}$, $E_{n,3}$, $E_{n,4}$, are four of the 8×8 DCTs that were generated by the MPEG-2 compression. Let $E_n$ denote the 16×16 block composed of the four 8×8 $E_{n,k}$ arranged in the same pattern as the $e_{n,1}$, $e_{n,2}$, $e_{n,3}$, $e_{n,4}$ form $e_n$.

Of course, if macroblocks $x_1$, $x_2$, $x_3$, $x_4$ were intra-coded, then there would be no motion vectors and the luminance parts, $y_1$, $y_2$, $y_3$, $y_4$, would each be viewed as a quartet of 8×8 luminance blocks ($y_n$ as the quartet $y_{n,1}$, $y_{n,2}$, $y_{n,3}$, $y_{n,4}$) and each $y_{n,k}$ is transformed (8×8 DCT) to $Y_{n,k}$ for encoding. Similar DCT blocks come from the chrominance blocks.

The approach of Liu et al for downsampling in the frequency domain by a factor of 2 in each dimension converts the quartet of (reconstructed) macroblocks, $x_1$, $x_2$, $x_3$, $x_4$, into a single macroblock x which is to be MPEG-4 compressed as follows. First, for each of the four 8×8 DCTs, $E_{n,k}$ (k=1, 2, 3, 4), from $E_n$, take only the upper left (low frequency) 4×4 DCT coefficients, and combine these four 4×4s to form a single 8×8 DCT block, $E_{-,n}$. Then these four DCT blocks (n=1, 2, 3, 4) are taken as E, the DCT blocks for the prediction error e of the luminance party of downsampled macroblock x. For intra-coded frames the same approach applies, but using the luminance in place of the luminance prediction error; namely, for each of the four 8×8 DCT blocks, $Y_{n,k}$ (k=1, 2, 3, 4), from $Y_n$, take only the upper left (low frequency) 4×4 DCT coefficients, and combine these four 4×4s to form a single 8×8 DCT block, $Y_{-,n}$. Then these four 8×8 DCT blocks (n=1, 2, 3, 4) are taken as Y, the DCT blocks for the 16×16 luminance party of downsampled macroblock x. Again, the chrominance blocks are treated analogously.

As illustrated in FIG. 1b, the first preferred embodiment frequency domain methods downsample in the frequency domain by adapting the downsampling to the incoming prediction format (frame-DCT blocks or field-DCT blocks for MPEG-2) as follows.

Frame-DCT blocks. Presume four 8×8 blocks $x_1$, $x_2$, $x_3$, $x_4$ in the spatial domain which are located as a 2×2 array forming a 16×16 block that is to be downsampled by a factor of 2 in each dimension to yield an output 8×8 block x; these blocks may be either prediction errors (residuals) of an inter-coded picture or blocks of pixels of an intra-coded picture. The preferred embodiment downsampling first averages pairs of pixels in the vertical direction and then averages pairs of the prior averages in the horizontal direction. This can be written in 8×8 matrix format as:

$$x = (Q_1 x_1 Q_1^t + Q_1 x_2 Q_2^t + Q_2 x_3 Q_1^t + Q_2 x_4 Q_2^t)/4$$

where superscript t denotes transpose and the 8×8 matrics $Q_1$ and $Q_2$ are:

$$Q_1 = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

and $$Q_2 = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Note that the left multiplication by $Q_k$ averages pairs vertically and that the right multiplication by $Q_k^t$ averages pairs horizontally. Now let $X_k$ denote the 8×8 DCT of $x_k$; that is, $X_k = S x_k S^{-1}$ where S is the 8×8 DCT matrix. Because S is orthogonal, $S^{-1} = S^t$ and $S^t$ is explicitly given by:

$$\begin{bmatrix} 0.3536 & 0.4904 & 0.4619 & 0.4157 & 0.3536 & 0.2778 & 0.1913 & 0.0975 \\ 0.3536 & 0.4157 & 0.1913 & -0.0975 & -0.3536 & -0.4904 & -0.4619 & -0.2778 \\ 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4904 \\ 0.3536 & -0.0975 & -0.4619 & 0.2778 & 0.3536 & -0.4157 & -0.1913 & 0.4904 \\ 0.3536 & -0.2778 & -0.1913 & 0.4904 & -0.3536 & -0.0975 & 0.4619 & -0.4157 \\ 0.3536 & -0.4157 & 0.1913 & 0.0975 & -0.3536 & 0.4904 & -0.4619 & 0.2778 \\ 0.3536 & -0.4904 & 0.4619 & -0.4157 & 0.3536 & -0.2778 & 0.1913 & -0.0975 \end{bmatrix}$$

Further, let $U_1$ and $U_2$ denote the frequency domain versions of $Q_1$ and $Q_2$, respectively; that is, $U_1 = SQ_1 S^{-1}$ and $U_2 = SQ_2 S^{-1}$.

Now taking the DCT of the foregoing spatial domain downsampling expression yields the corresponding frequency domain downsampling expression:

$$X = (U_1 X_1 U_1^t + U_1 X_2 U_2^t + U_2 X_3 U_1^t + U_2 X_4 U_2^t)/4$$

Thus the four input 8×8 DCT blocks ($X_k$) determine the downsampled output 8×8 DCT block (X) by matrix operations with the $U_k$ matrices. This approach has low computational complexity due to the possibility of factoring the matrices to simplify the matrix operations. In particular, make the following definitions:

$$X_{+++} = X_1 + X_2 + X_3 + X_4$$

$$X_{+--} = X_1 + X_2 - X_3 - X_4$$

$X_{-+-} = X_1 - X_2 + X_3 - X_4$ $X_{--+} = X_1 - X_2 - X_3 + X_4$

Note that these combinations require at most only eight additions/subtractions per frequency component. Then, with these combinations the expression for X becomes:

$X = (U_+ X_{+++} U_+^t + U_- X_{+--} U_+^t + U_+ X_{-+-} U_-^t + U_- X_{--+} U_-^t)/16$ where $U_+ = U_1 + U_2$ and $U_- = U_1 - U_2$. These two combination matrices factor as $U_+ = DPB_1B_2F_{+}B_2^{-1}B_1^{-1}P^{-1}D^{-1}$ and $U_- = DPB_1B_2F_{-B2}^{-1}B_1^{-1}P^{-1}D^{-1}$ where the matrices D, P, $B_1$, $B_2$, $F_-$, and $F_+$ are listed in the following; this factoring provides for fast computations and ultimately derives from Arai et al, cited in the background. Note that D is a diagonal 8×8 matrix and the off-diagonal 0s have been omitted for clarity.

$D = \begin{bmatrix} 0.3536 & & & & & & & \\ & 0.2549 & & & & & & \\ & & 0.2706 & & & & & \\ & & & 0.3007 & & & & \\ & & & & 0.3536 & & & \\ & & & & & 0.4500 & & \\ & & & & & & 0.6533 & \\ & & & & & & & 1.2814 \end{bmatrix}$ $P = \begin{bmatrix} 1 & 0 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 1 & 0 & 0 & 0 \\ 0 & 0 & 0 & 1 & 0 & 0 & 0 & 0 \\ 0 & 0 & 0 & 0 & 0 & 0 & 1 & 0 \end{bmatrix}$ $B_1 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & -1 & 0 & 0 & 1 \end{bmatrix}$ $B_2 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & 1 & 0 & 0 & 0 \\ 0 & 0 & 0 & 0 & 0 & 1 & 0 & 1 \\ 0 & 0 & 0 & 0 & 0 & 0 & 1 & 0 \\ 0 & 0 & 0 & 0 & 0 & -1 & 0 & 1 \end{bmatrix}$ -continued $F_+ = \begin{bmatrix} 2 & 0 & 0 & 0 & 0 & 0 & 0 & 0 \\ 0 & 0 & 2.8285 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & -0.7071 & 0 & -1.7071 & 0 \\ 0 & 0 & 0 & 0 & 0 & 0 & 0 & 0 \\ 0 & 0 & 0 & 0 & 0.2929 & 0 & 0.7071 & 0 \\ 0 & 0 & 0 & 0 & -0.3827 & 0 & 0.9239 & 0 \end{bmatrix}$ $F_- = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0.7653 & 0 & 1.8477 & 0 \\ 0 & 0 & 0 & 0 & -0.7652 & 0 & 1.8477 & 0 \\ 0.5412 & 0 & 0 & 0 & 0 & 0 & 0 & 0 \\ 0.7071 & 0 & -1 & 0 & 0 & 0 & 0 & 0 \\ 1.3066 & 0 & 0 & 0 & 0 & 0 & 0 & 0 \\ 0.5000 & 0 & 0.7071 & 0 & 0 & 0 & 0 & 0 \end{bmatrix}$ Field-DCT blocks. The 16×16 luminance part of a macroblock in field-DCT coding consists of two horizontally-adjacent 8×8 blocks which make up the top field (16 columns by 8 rows) and the two corresponding 8×8 blocks of the bottom field, so the resulting four 8×8 DCT blocks consist of two from the top field and two from the bottom field. Reconstruction vertically interlaces these blocks after IDCT. More particularly, denote the four 8×8 luminance field blocks as $x^{top}_1, x^{top}_2, x^{bot}_3, x^{bot}_4$ which, when interlaced, form a 16×16 block that is to be downsampled by a factor of 2 in each dimension to yield an output 8×8 block x. Again, these blocks may be either inter-coded field prediction errors or intra-coded field pixels; and denote the corresponding 8×8 DCT blocks as $X^{top}_1, X^{top}_2, X^{bot}_3, X^{bot}_4$ which are encoded in the MPEG-2 bitstream. The preferred embodiment downsampling first averages pairs of pixels in the horizontal direction and then averages the top and bottom fields. That is:

$x^{top} = (x^{top}_1 Q_1^t + x^{top}_2 Q_2^t)/2$ $x^{bot} = (x^{bot}_3 Q_1^t + x^{bot}_4 Q_2^t)/2$ $x = (x^{top} + x^{bot})/2$ Again, to have this downsampling in the frequency domain, apply DCT:

$X^{top} = (X^{top}_1 U_1^t + X^{top}_2 U_2^t)/2$ $X^{bot} = (X^{bot}_3 U_1^t X^{bot}_4 U_2^t)/2$ $X = (X^{top} + X^{bot})/2$ And as previously noted, the matrices factor to simplify the computations. In particular, $U_k = DPB_1B_2MA_1A_2A_3Q_k A_3^{-1}A_2^{-1}A_1^{-1}M^{-1}B_2^{-1}B_1^{-1}P^{-1}D^{-1}$ where $$M = \begin{bmatrix} 1 & 0 & 0 & 0 & 0 & 0 & 0 & 0 \\ 0 & 1 & 0 & 0 & 0 & 0 & 0 & 0 \\ 0 & 0 & 0.7071 & 0 & 0 & 0 & 0 & 0 \\ 0 & 0 & 0 & 1 & 0 & 0 & 0 & 0 \\ 0 & 0 & 0 & 0 & -0.9239 & 0 & -0.3827 & 0 \\ 0 & 0 & 0 & 0 & 0 & 0.7071 & 0 & 0 \\ 0 & 0 & 0 & 0 & -0.3827 & 0 & 0.9239 & 0 \\ 0 & 0 & 0 & 0 & 0 & 0 & 0 & 1 \end{bmatrix}$$

$$A_1 = \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

$$A_2 = \begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & -1 & -1 & 0 & 0 \\ 0 & 0 & 0 & 0 & 0 & 1 & 1 & 0 \\ 0 & 0 & 0 & 0 & 0 & 0 & 1 & 1 \\ 0 & 0 & 0 & 0 & 0 & 0 & 0 & 1 \end{bmatrix}$$

$$A_3 = \begin{bmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{bmatrix}$$

Figure 3D:
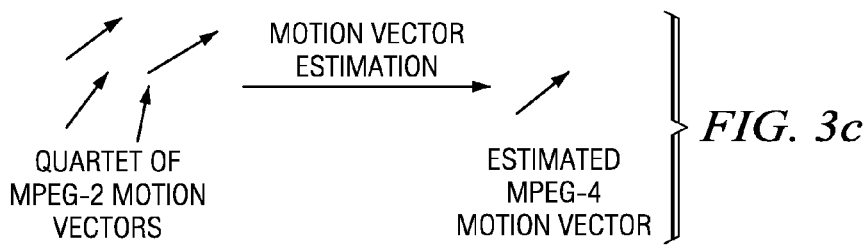
Figure 3D:
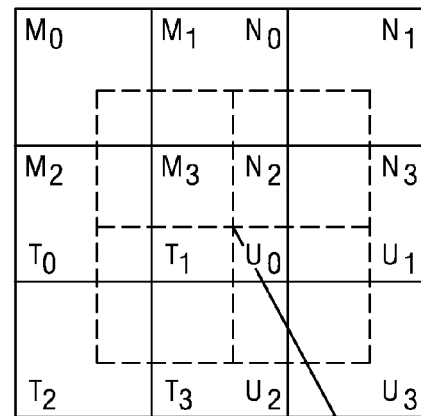
Figure 3D:
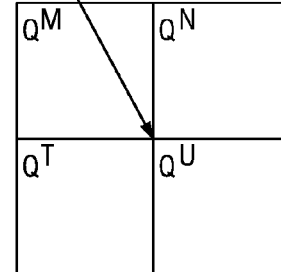

After the downsampling in the frequency domain, the FIG. 4b transcoder structure requires (inverse) motion compensation (reconstruction) in the frequency domain which converts inter-coded frames/fields into intra-coded frames/fields in order to then apply MPEG-4 encoding (with estimated motion vectors as in section 2). The preferred embodiments use an inverse motion compensation method which takes advantage of correlations between blocks of a macroblock to lower computational cost; see the Song et al reference in the background. In particular, FIG. 3d illustrates prediction of each of 8×8 blocks $Q^M, Q^N, Q^T, Q^U$ from their corresponding 16×16 anchor blocks M, N, T, and U where M is made up of the four 8×8 blocks $M_0, M_1, M_2,$ and $M_3$; N is made up of the four 8×8 blocks $N_0, N_1, N_2,$ and $N_3$; and analogously for T and U. As FIG. 3c shows, the 16×16 anchor blocks have common 8×8 blocks: $M_1$ is the same as $N_0$, and $M_3, N_2, T_1,$ and $U_0$ are all the same 8×8 block; et cetera. Now the single motion vector for Q locates the 8×8 reference in M for $Q^M$, the 8×8 reference in N for $Q^N$, the 8×8 reference in T for $Q^T$, and the 8×8 reference in U for $Q^U$. Thus the horizontal and vertical displacements of the 8×8 reference for $Q^M$ within M are the same as the displacements of the $Q^N$ reference within N, the displacements of the $Q^T$ reference within T, and the displacements of the $Q^U$ reference within U. This identity of displacements allows for rearrangement of the inverse motion compensation computations as follows.

First some notation: let $P_{ref}$ denote an 8×8 reference block made from the four neighboring 8×8 blocks $P_0, P_1, P_2, P_3$; this can be written in 8×8 matrix format as $P_{ref} = \Sigma_{0 \leq j \leq 3} S_{j1} P_j S_{j2}$ with $S_{j1}$ and $S_{j2}$ 8×8 matrices like:

$$L_n = \begin{bmatrix} 0_{(8-n) \times n} & 0_{(8-n) \times (8-n)} \\ I_{n \times n} & 0_{n \times (8-n)} \end{bmatrix}$$

or $$R_n = \begin{bmatrix} 0_{n \times (8-n)} & I_{n \times n} \\ 0_{(8-n) \times (8-n)} & 0_{n \times (8-n)} \end{bmatrix}$$

where $I_{n \times n}$ is an n×n identity matrix and $0_{k \times m}$ is a k×m 0 matrix. For example, for $S_{j1}$ of the form $L_n$ and $S_{j2}$ of the form $R_m$, $S_{j1} P_j S_{j2}$ is an 8×8 matrix with the lower right n×m block the same as the upper left n×m block of $P_j$ and the remaining elements all equal to 0.

With this notation, $Q^M = \Sigma_{0 \leq j \leq 3} S_{j1} M_j S_{j2}$ for appropriate $S_{jk}$ (determined by the motion vector) and $Q^N = \Sigma_{0 \leq j \leq 3} S_{j1} N_j S_{j2}$ with the same $S_{jk}$ because of the same relative locations in the reference macroblock (same motion vector). Similarly, $Q^T$ and $Q^U$ also use the same $S_{jk}$. This reflects the four 8×8 blocks making up the macroblock Q all have the same motion vector.

Next, these four sums can each be rewritten by adding and subtracting terms; and this can reveal duplicative computations among the four sums. In particular, $$Q^M = \sum_{0 \leq j \leq 3} S_{j1} M_j S_{j2}$$
$$= S_{01}(M_0 - M_1 - M_2 + M_3) S_{02} + S_{01}(M_1 - M_3) P^0 +$$
$$P^1(M_2 - M_3) S_{02} + P^1 M_3 P^0 \ldots$$

where $P^0 = S_{02} + S_{12}$ is a permutation matrix because $S_{02}$ and $S_{12}$ move columns in opposite directions and have complementary size, and similarly $P^1 = S_{01} + S_{31}$ is another permutation matrix. Similarly, $Q^N$ yields $$Q^N = \sum_{0 \leq j \leq 3} S_{j1} N_j S_{j2}$$
$$= S_{01}(N_1 - N_0 - N_3 + N_2) S_{12} + S_{01}(N_0 - N_2) P^0 +$$
$$P^1(N_3 - N_2) S_{12} + P^1 N_2 P^0 \ldots$$

And due to $N_0 = M_1$ and $N_2 = M_3$, the second and fourth terms of this sum are the same as second and fourth terms in the sum for $Q^M$, which will allow reuse of computations in the following.

Analogously, $$Q^T = \sum_{0 \leq j \leq 3} S_{j1} T_j S_{j2}$$
$$= S_{21}(T_2 - T_3 - T_0 + T_1)S_{02} + S_{21}(T_3 - T_1)P^0 +$$
$$P^1(T_0 - T_1)S_{02} + P^1 T_1 P^0 \ldots$$

and $$Q^U = \sum_{0 \leq j \leq 3} S_{j1} U_j S_{j2}$$
$$= S_{21}(U_3 - U_2 - U_1 + U_0)S_{12} + S_{21}(U_2 - U_0)P^0 +$$
$$P^1(U_1 - U_0)S_{12} + P^1 U_0 P^0 \ldots$$

Now to compute $DCT(Q^M)$, $DCT(Q^N)$, $DCT(Q^T)$, and $DCT(Q^U)$, which are the four prediction error DCTs, begin with $DCT(Q^M)$ and use the similarity transform nature of the DCT to have $$DCT(Q^M) =$$
$$DCT(S_{01})\{DCT(M_0) - DCT(M_1) - DCT(M_2) + DCT(M_3)\}DCT(S_{02}) +$$
$$DCT(S_{01})\{DCT(M_1) - DCT(M_3)\}DCT(P^0) +$$
$$DCT(P^1)\{DCT(M_2) - DCT(M_3)\}DCT(S_{02}) +$$
$$DCT(P^1)DCT(M_3)DCT(P^0) \ldots$$

Second, compute $DCT(Q^N)$, $$DCT(Q^N) =$$
$$DCT(S_{01})\{DCT(N_1) - DCT(N_0) - DCT(N_3) + DCT(N_2)\}DCT(S_{12}) +$$
$$DCT(S_{01})\{DCT(N_0) - DCT(N_2)\}DCT(P^0) +$$
$$DCT(P^1)\{DCT(N_3) - DCT(N_2)\}DCT(S_{12}) +$$
$$DCT(P^1)DCT(N_2)DCT(P^0) \ldots$$

And as previously noted, $N_0=M_1$ and $N_2=M_3$, so in the second line of the expression for $DCT(Q^N)$ the $DCT(S_{01})\{DCT(N_0)-DCT(N_2)\}DCT(P^0)$ has already been computed as $DCT(S_{01})\{DCT(M_1)-DCT(M_3)\}DCT(P^0)$ in the second line of $DCT(Q^M)$. Similarly, the fourth line of $DCT(Q^N)$, $DCT(P^1)DCT(N_2)DCT(P^0)$, is the same as the fourth line of $DCT(Q^M)$, $DCT(P^1)DCT(M_3)DCT(P^0)$. Thus the computation of $DCT(Q^N)$ can reuse computations from $DCT(Q^M)$.

Third, compute $DCT(Q^T)$ noting that $T_0=M_2$ and $T_1=M_3$, so the computations can use the equalities $P^1(T_0-T_1)S_{02}=P^1(M_2-M_3)S_{02}$ and $P^1 T_1 P^0 = P^1 M_3 P^0$, and thereby reuse computations from $DCT(Q^M)$.

Fourth, compute $DCT(Q^U)$. Initially, note that $U_0=T_1$ and $U_2=T_3$, so use $S_{21}(U_2-U_0)P^0 = S_{21}(T_3-T_1)P^0$ and $P^1 U_0 P^0 = P^1 T_1 P^0$ and thus reuse terms from the third computation. Lastly, note that $U^0=N_2$ and $U_1=N_3$, so $P^1(U_1-U_0)S_{12}=P^1(N_3-N_2)S_{12}$ and thus reuse the term from the second computation.

5. Motion Vector Refinement in the Frequency Domain

Section 2 described how MPEG-4 motion vectors may be estimated for the downsampled macroblocks from the MPEG-2 motion vectors contained in the input bitstream. After the estimation, a half-pixel motion-vector refinement has been shown to improve the reliability of the estimate. However, such a refinement is difficult to implement in frequency-domain transcoders that use the scheme outlined in FIG. 4b. Plompen et al., A New Motion-Compensated Transform Coding Scheme, IEEE Proc. Int. Conf. ASSP (1985), and The Performance of a Hybrid Videoconferencing Coder Using Displacement Estimation in the Transform Domain, IEEE Proc. Int. Conf. ASSP (1986), suggested a method for frequency-domain motion estimation that may also be used for frequency-domain motion-vector refinement. However, because their method is based on the Hadamard transform, it is not as computationally efficient for frequency domain motion-vector refinement. More recently, Liang et al., in cross-referenced patent application Ser. No. 09/089,290, filed Jun. 1, 1998 and published Dec. 26, 2002, proposed a fast algorithm for frequency-domain motion-vector refinement. However, this method is computationally expensive when the macroblock is aligned with reference DCT blocks.

Figure 5A:
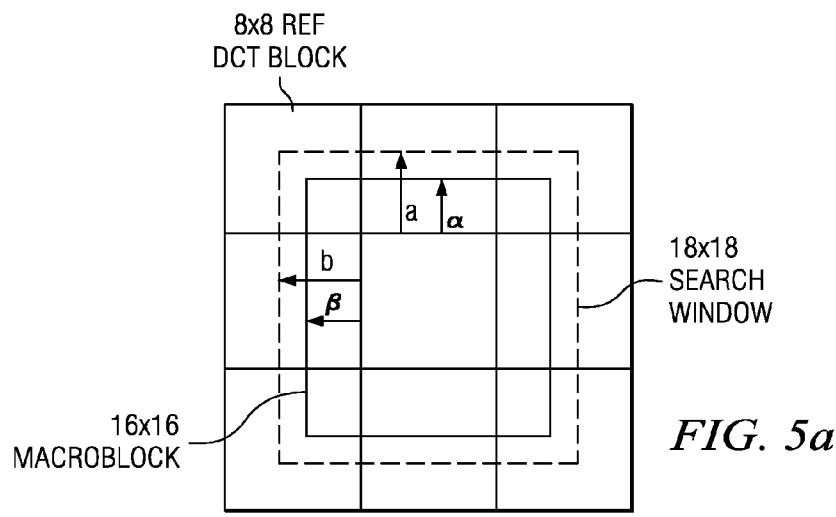
FIGS. 5a-5c illustrates motion vector refinement.

The preferred embodiment motion vector refinement methods apply to the FIG. 4b frequency-domain transcoder that outputs an MPEG-4 bitstream; the MPEG-4 encoder input is a sequence of frames comprised of 8×8 intra DCT blocks. The first frame is encoded as an I-frame and each successive frame becomes a P-frame that is predicted from the preceding frame. During encoder motion-estimation, derive a motion-vector estimate and corresponding figure of merit for each macroblock. If the figure of merit indicates a poor motion-vector estimate, then perform a 0.5 pixel motion-vector refinement as explained below. To refine the motion-vector estimate for a particular 16×16 macroblock, the constituent DCT blocks (four for luminance and one or more for each chrominance) are IDCT'd and the motion-vector estimate is used to co-locate the macroblock against the DCT blocks in the preceding reference frame, as depicted in FIG. 5a. If the reference DCT blocks covered by the macroblock are IDCT'd, then an 18×18 search window may be used for the bilinear interpolation that precedes a 0.5 pixel motion-vector refinement. Unfortunately, this straightforward approach is computationally expensive; consequently, the preferred embodiment methods provide a reduced-complexity implementation as follows.

The alignment of the gray macroblock against the reference DCT blocks in FIG. 5a creates three cases of interest. In FIG. 5a, $\alpha$ ($\beta$) measures the displacement of the upper (left) macroblock boundary from the nearest, covered, upper (left) boundary of a reference 8×8 DCT block. The first case deals with the situation in which the macroblock is not aligned with any reference DCT block boundaries; therefore, $8>\alpha>0$, $8>\beta>0$ and nine reference DCT blocks are covered by the macroblock. Now define an 18×18 search window whose alignment against the reference DCT blocks is described by a and b, where $a=\alpha+1$ and $b=\beta+1$. This search window also covers only nine reference DCT blocks and the pixels in the window may be obtained from these blocks using Liang et al.'s fast algorithm as described at the end of the section. Using this search window and the macroblock, perform a half-pixel motion-vector refinement. The refined motion vector indicates the portion of the search window that is subtracted from the macroblock to obtain residual blocks which yield the P-frame macroblock after a DCT operation.

Figure 5B:
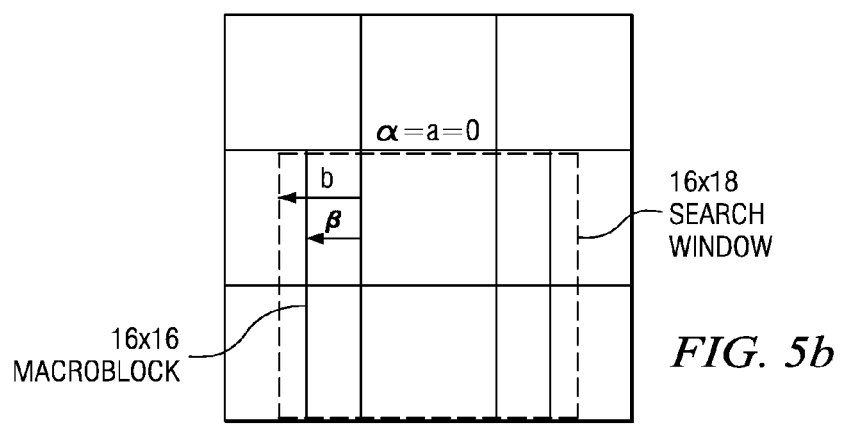

In the second case, $\alpha=0$ and $\beta>0$ so that the upper boundary of the macroblock is aligned with a reference DCT block boundary, as shown in FIG. 5b. Here the macroblock covers six reference DCT blocks. Set $a=\alpha+1$ and $b=\beta+1$ to define an 18×18 search window as in the first case, then twelve reference DCT blocks will be covered by the search window. Even with Liang et al.'s fast algorithm, computing the IDCT of all these reference blocks to obtain the pixels in the window is expensive. To reduce the complexity, the preferred embodiment refinement methods set a=0 and b=β+1 thereby obtaining a 16×18 search window whose upper boundary aligns with the reference DCT boundary. Now use Liang et al.'s fast algorithm to recover the search-window pixels from the six reference DCT blocks covered by the window. Next, symmetrically extend the top and bottom of the search window to obtain an 18×18 window. Implement the symmetric extension by creating new top and bottom rows that are copies of the old top and bottom rows respectively. This symmetric extension technique is justified if the image is smooth along the search window boundaries. Finally, refine the motion vector using the 18×18 search window as explained in the first case.

Figure 5C:
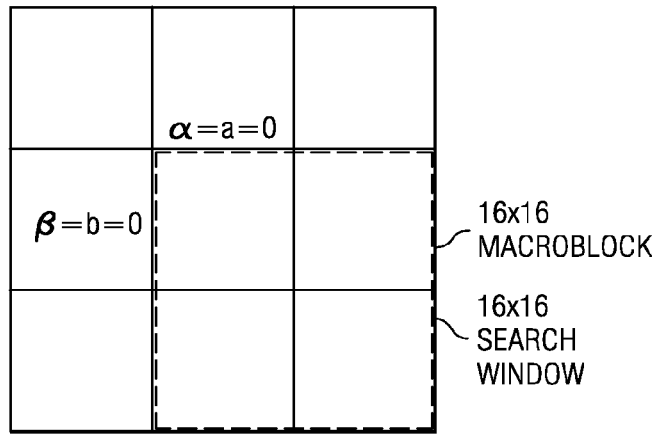

In the third case, α=0 and β=0 so that the upper and left boundaries of the macroblock are aligned with reference DCT block boundaries, as shown in FIG. 5c. Four reference DCT blocks are covered by the macroblock. On setting a=α+1 and b=β+1 to define an 18×18 search window as in the first case, 16 reference DCT blocks would be covered by the search window. Computing the IDCT of these many blocks is prohibitive. Once again, to reduce the complexity, set a=b=0 to obtain a 16×16 search window that covers four reference DCT blocks. The search window pixels are obtained by applying IDCTs to the four DCT blocks. As in the second case, first symmetrically extend the top and bottom of the search window to obtain a 18×16 search window. Next, symmetrically extend the left and right boundaries of the search window by copying the old left-most and right-most columns to obtain the new left-most and right-most columns of a 18×18 search window. This search window is now used for motion refinement as in the first case.

The Liang et al method for obtaining pixel values in corner subblocks of 8×8 blocks from the 8×8 DCT blocks uses the DCTs of cropping matrices which define these corner subblocks and proceeds as follows.

The operation on each 8×8 block involved in a reference macroblock is either (1) obtain all of the pixels in the block or (2) crop the block so that only the pixels needed remain. In matrix terminology, the operation of cropping a part of a block can be written as matrix multiplications. For instance, cropping the last m rows of an 8×8 matrix A can be written as $A_{crop}=C_L A$ where $C_L$ is the 8×8 matrix with all elements equal to 0 except $C_L(j,j)=1$ for $8-m \leq j \leq 7$. Similarly, with $C_R$ the 8×8 matrix with all 0 elements except $C_R(j,j)=1$ for $8-n \leq j \leq 7$, post-multiplication by $C_R$ crops the last n columns. Thus the operation of cropping the lower right m rows by n columns submatrix of A can be written as $A_{crop}=C_L A C_R$.

Now denoting the 2-D DCT of A by $\overline{A}$ means $A=S^t \overline{A} S$ where S is the 8×8 DCT transformation matrix. Thus $A_{crop}=C_L S^t \overline{A} S C_R$. And then denoting the product $C_L S^t$ as U and $C_R S^t$ as T implies $A_{crop}=U \overline{A} T^t$. Note that the first 8−m rows of U are all zeros and the first 8−n rows of T are all zeros. Thus denoting the m×8 matrix of the m nonzero rows of U as $U_C$ and the 8×n matrix of the n nonzero rows of T as $T_C$, the m×n matrix $A_{cropped}$ consisting of the cropped portion of A is given by $A_{cropped}=U_C \overline{A} T_C^t$. Actually, $U_C$ is the last m rows of the inverse 8×8 DCT matrix, and $T_C$ is the last n rows of the inverse 8×8 DCT matrix $S^t$.

And a 16×16 reference block for the motion vector searching is assembled from the pixels of these cropped subblocks. The first case of FIG. 5a would have one full 8×8 IDCT plus eight cropped blocks. And the IDCTs have fast computation methods by using a factorization of the DCT matrix as follows. First, note that the 8×8 DCT matrix $S=DPB_1B_2MA_1A_2A_3$ where these 8×8 factor matrices are the same as those of section 4.

After applying the foregoing fast DCT on the columns and then applying the cropping matrix, only m nonzero rows exist. The computation for the row DCT then takes only 42 m operations. Also, either $A_{cropped}$ or $A_{cropped}^t$ could be computed, so the total computation amounts to 336+42 min(m,n) operations.

Alternative preferred embodiment methods refine the motion vector for a single target N×N block which has an N×N reference block lying within a 2×2 array of reference frame N×N blocks; this corresponds to considering just one of the four blocks of the macroblocks in the foregoing. Again, if the reference block does not align with the blocks of the reference frame, then have a search window by expanding the reference block one row/column on each side. But if the reference block does align with a block of the reference frame, then again pad on the aligned sides to create the search window.

6. Fast, Drift-Free Transcoding

The foregoing sections 4 and 5 describe preferred embodiment methods that improve the performance of frequency-domain transcoders which are based on the framework depicted in FIG. 4b. Although these methods make effective use of computational and memory resources, frequency-domain motion compensation is difficult to implement. Moreover, because frequency-domain motion compensation must be invoked twice in the transcoder, the gain from the elimination of the IDCT/DCT blocks is small. In addition, frequency domain downsampling techniques result in frames that differ significantly from the original resolution frames. When these altered frames are used for motion compensation, drift artifacts result. Section 4 proposes a reduced-complexity implementation of Vetro et al.'s intra-refresh technique to mitigate drift artifacts. Now this section shall provide computationally efficient preferred embodiment transcoding methods that eliminate drift artifacts. Section 8 shall demonstrate that the new transcoding methods may be used to implement a multi-format transcoder.

To eliminate the drift artifacts in frequency-domain transcoders based on the framework of FIG. 4b, first observe that frequency-domain downsampling algorithms use frequency-domain operators to perform horizontal and vertical averaging followed by decimation. For interlaced video sequences, vertically averaged fields may differ significantly from the top and bottom fields. This causes severe drift artifacts because motion compensation must be performed specifically from the individual fields. Therefore, to eliminate drift, vertical averaging should be avoided. To downsample interlaced frames in the spatial domain without vertical averaging, Ghanbari advocates extraction of the top field of each frame followed by averaging of even and odd-polyphase components along every row (averaging with respect to the column index).

The preferred embodiment drift-free methods effectively extract the top field in the frequency domain followed by horizontal averaging in the spatial domain. The Downsample-IDCT stage of the preferred embodiment transcoder illustrated in FIG. 6 performs the method. The Downsample-IDCT stage is an IDCT implementation that functions differently for B-frames and for anchor I-/P-frames as follows.

For B-frames, first downsample frame-DCT blocks vertically with a de-interlacing one-dimensional (1-D) IDCT that outputs the top field of each frame-DCT block in the spatial-frequency domain (frequency domain for the horizontal dimension, spatial domain for the vertical dimension). Section 7 explains an implementation of the de-interlacing 1-D IDCT. Next, apply a 1-D IDCT to each of the rows of this top field and then horizontally downsampled by either (a) averaging the even- and odd-polyphase components of each row in the field or (b) dropping the odd-polyphase component of each row. The latter approach to horizontal downsampling is faster but may produce slightly perceptible artifacts.

(For B-frames with field-DCT blocks, the first downsampling is just selection of the top field DCT followed by a vertical IDCT and then one of the horizontal downsampling methods.)

For I/P-frames (frame-DCT blocks), apply 2-D IDCT to the DCT-blocks to convert to spatial domain, and then horizontally downsample using one of the approaches as previously described for the B-frames: either horizontal averaging or odd phase discarding. Vertical downsampling for I/P-frames is postponed because both top and bottom fields of the I/P-frames are required during the subsequent motion compensation.

(For I/P-frames with field-DCT blocks, apply 2-D IDCT and then a horizontal downsampling for both top and bottom field blocks; again postpone vertical downsampling until after motion compensation.)

After the B-frame vertical and horizontal downsampling and the I/P-frame horizontal downsampling, perform inverse motion compensation (reconstruction) to convert inter blocks to intra blocks as follows.

For B-frames, only the top fields are motion compensated using either the top or bottom field of the horizontally down-sampled I/P-frames.

For P-frames, perform usual motion compensation. Then vertically downsample the I/P-frames by discarding the bottom fields of these frames.

Figure 6:
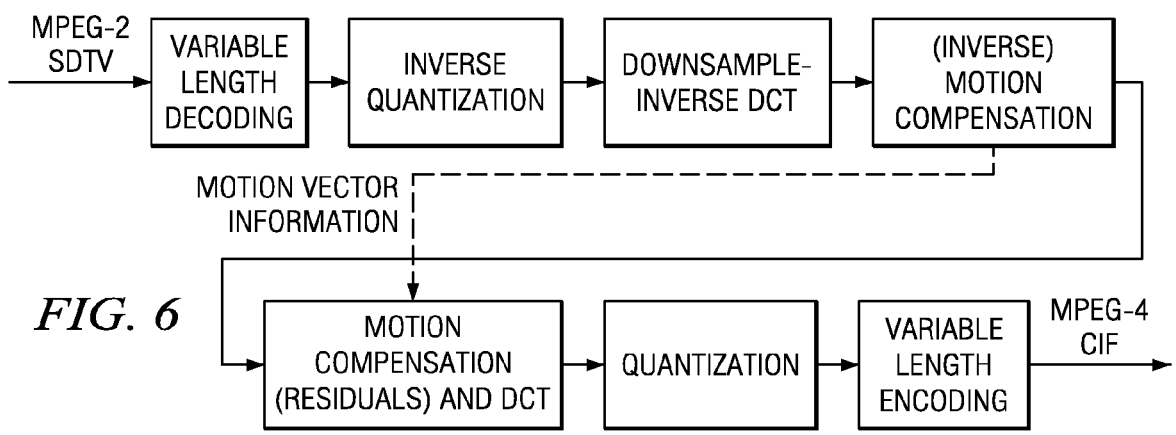
FIG. 6 is another transcoder.

The thus-decoded (reconstructed), spatially-downsampled frames are fed to an MPEG-4 encoder which generates the output bitstream using motion estimation with re-used motion vectors as illustrated in FIG. 6. Following section 7 describes the de-interlacing 1-D IDCT that enables efficient B-frame downsampling. Of course, bottom fields instead of top fields could be selected.

7. De-Interlacing 1-D IDCT

As described in section 6, the frequency-domain transcoding scheme depicted in FIG. 6 provides fast, drift-free transcoding because expensive frequency-domain motion compensation is avoided and vertically averaged fields are not used for motion compensation. To implement this scheme, the Downsample-IDCT stage must directly extract the spatial-domain even polyphase components (top field) from B-frame frame-DCT blocks. This extraction is efficient because unwanted polyphase components are not computed. The following explains how to implement an IDCT method that extracts polyphase components from frame-DCT blocks. Suppose that x is a length-N data sequence and z is the N-point DCT of x. Denote the even- and odd-polyphase components (each length N/2) of x by $x_e$ and $x_o$, respectively. Let $z_p$ and $z_r$ represent the even- and odd-polyphase components of z in bit-reversed order, respectively. In particular, for N=8:

$$x_e = \begin{bmatrix} x_0 \\ x_2 \\ x_4 \\ x_6 \end{bmatrix}, x_o = \begin{bmatrix} x_1 \\ x_3 \\ x_5 \\ x_7 \end{bmatrix}, z_p = \begin{bmatrix} z_0 \\ z_4 \\ z_2 \\ z_6 \end{bmatrix},$$

$$\text{and } z_r = \begin{bmatrix} z_1 \\ z_5 \\ z_3 \\ z_7 \end{bmatrix}$$

Now, the expression of the N-point DCT in terms of the N/2-point DCT (see Hou reference in the background) relates z to x through T(N), an N×N decimation-in-time DCT matrix, as follows:

$$\begin{bmatrix} z_p \\ z_r \end{bmatrix} = N/2 \begin{bmatrix} T(N/2) & T(N/2) \\ KT(N/2)Q & -KT(N/2)Q \end{bmatrix} \begin{bmatrix} x_e \\ x_o \end{bmatrix}$$

where the matrix on the right side is T(N) and thus recursively defines T( ) with initial $$T(2) = \begin{bmatrix} 1 & 1 \\ \cos(\pi/4) & -\cos(\pi/4) \end{bmatrix}$$

($z_0$ is scaled by $\sqrt{2}$ for notational convenience); Q is a N/2×N/2 diagonal matrix: diag[cos((4 m+1)π/2N)] for m=0, 1, ..., N/2−1; and K=RLR$^t$, where R is the bit-reversal permutation matrix; and L is the N/2×N/2 lower-triangular matrix:

$$L = \begin{bmatrix} 1 & 0 & 0 & 0 & \cdots & 0 \\ -1 & 2 & 0 & 0 & \cdots & 0 \\ 1 & -2 & 2 & 0 & \cdots & 0 \\ \vdots & \vdots & \vdots & \vdots & \ddots & \vdots \\ -1 & 2 & -2 & 2 & \cdots & 2 \end{bmatrix}$$

Matrix inversion (the DCT matrix is orthogonal, so inversion is transposition) shows that the polyphase components of x are given by $$\begin{bmatrix} x_e \\ x_o \end{bmatrix} = 2/N \begin{bmatrix} T^t(N/2) & QT^t(N/2)K^t \\ T^t(N/2) & -QT^t(N/2)K^t \end{bmatrix} \begin{bmatrix} z_p \\ z_r \end{bmatrix}$$

Therefore, the even polyphase-component of the data may be directly extracted from the DCT block by $$x_e = T^t(N/2)z_p + QT^t(N/2)K^t z_r$$

For N=8, $x_e = T^t(4)z_p + QT^t(4)K^t z_r$, and the 4-point IDCT, $T^t(4)$, requires 4 adds and 9 multiplies using the Lee decomposition. Multiplication with K requires 6 adds and 5 shifts while multiplication with Q requires 4 multiplies. Note that the two 4-point IDCTs in the equation for $x_e$ may be performed in parallel.

More explicitly for N=8, the de-interlacing 1-D IDCT may be found as follows. First, the 1-D 8-point IDCT, using the abbreviation cN=cos(Nπ/16), is:

$$\begin{bmatrix} x_0 \\ x_1 \\ x_2 \\ x_3 \\ x_4 \\ x_5 \\ x_6 \\ x_7 \end{bmatrix} = 1/2 \begin{bmatrix} 1/\sqrt{2} & c1 & c2 & c3 & c4 & c5 & c6 & c7 \\ 1/\sqrt{2} & c3 & c6 & c9 & c12 & c15 & c18 & c21 \\ 1/\sqrt{2} & c5 & c10 & c15 & c20 & c25 & c30 & c35 \\ 1/\sqrt{2} & c7 & c14 & c21 & c28 & c35 & c42 & c49 \\ 1/\sqrt{2} & c9 & c18 & c27 & c36 & c45 & c54 & c63 \\ 1/\sqrt{2} & c11 & c22 & c33 & c44 & c55 & c66 & c77 \\ 1/\sqrt{2} & c13 & c26 & c39 & c52 & c65 & c78 & c91 \\ 1/\sqrt{2} & c15 & c30 & c45 & c60 & c75 & c90 & c105 \end{bmatrix} \begin{bmatrix} z_0 \\ z_1 \\ z_2 \\ z_3 \\ z_4 \\ z_5 \\ z_6 \\ z_7 \end{bmatrix}$$

Then consider only the even indices of x, and apply the 2π periodicity of the cosine, c(N+32)=cN, to have:

$$\begin{bmatrix} x_0 \\ x_2 \\ x_4 \\ x_6 \end{bmatrix} = 1/2 \begin{bmatrix} 1 & c1 & c2 & c3 & c4 & c5 & c6 & c7 \\ 1 & c5 & c10 & c15 & c20 & c25 & c30 & c3 \\ 1 & c9 & c18 & c27 & c4 & c13 & c22 & c31 \\ 1 & c13 & c26 & c7 & c20 & c1 & c14 & c27 \end{bmatrix} \begin{bmatrix} z_0/\sqrt{2} \\ z_1 \\ z_2 \\ z_3 \\ z_4 \\ z_5 \\ z_6 \\ z_7 \end{bmatrix}$$

Note that the √2 has been moved from the matrix into the $z_0$ component. Next, separate the even and odd indices of z to yield:

$$\begin{bmatrix} x_0 \\ x_2 \\ x_4 \\ x_6 \end{bmatrix} = 1/2 \begin{bmatrix} 1 & c2 & c4 & c6 \\ 1 & c10 & c20 & c30 \\ 1 & c18 & c4 & c22 \\ 1 & c26 & c20 & c14 \end{bmatrix} \begin{bmatrix} z_0/\sqrt{2} \\ z_2 \\ z_4 \\ z_6 \end{bmatrix} + 1/2 \begin{bmatrix} c1 & c3 & c5 & c7 \\ c5 & c15 & c25 & c3 \\ c9 & c27 & c13 & c31 \\ c13 & c7 & c1 & c27 \end{bmatrix} \begin{bmatrix} z_1 \\ z_3 \\ z_5 \\ z_7 \end{bmatrix}$$

Using the symmetries of the cosine, cN=c(32−N) and cN=−c(16−N), plus reverse-bit ordering the z components gives:

$$\begin{bmatrix} x_0 \\ x_2 \\ x_4 \\ x_6 \end{bmatrix} = 1/2 \begin{bmatrix} 1 & c4 & c2 & c6 \\ 1 & -c4 & -c6 & c2 \\ 1 & c4 & -c2 & -c6 \\ 1 & -c4 & c6 & -c2 \end{bmatrix} \begin{bmatrix} z_0/\sqrt{2} \\ z_2 \\ z_4 \\ z_6 \end{bmatrix} + 1/2 \begin{bmatrix} c1 & c5 & c3 & c7 \\ c5 & c7 & -c1 & c3 \\ -c7 & -c3 & c5 & c1 \\ -c3 & c1 & c7 & c5 \end{bmatrix} \begin{bmatrix} z_1 \\ z_5 \\ z_3 \\ z_7 \end{bmatrix}$$

The first 4×4 matrix is just the 4-point 1-D IDCT matrix; and as previously noted, the second 4×4 matrix factors into the product of three factors: (1) a diagonal matrix of cosines, (2) the 4-point 1-D IDCT matrix, and (3) a simple matrix K:

$$\begin{bmatrix} c1 & c5 & c3 & c7 \\ c5 & c7 & -c1 & c3 \\ -c7 & -c3 & c5 & c1 \\ -c3 & c1 & c7 & c5 \end{bmatrix} = \begin{bmatrix} c1 & 0 & 0 & 0 \\ 0 & c5 & 0 & 0 \\ 0 & 0 & -c7 & 0 \\ 0 & 0 & 0 & -c3 \end{bmatrix} \begin{bmatrix} 1 & c4 & c2 & c6 \\ 1 & -c4 & -c6 & c2 \\ 1 & c4 & -c2 & -c6 \\ 1 & -c4 & c6 & -c2 \end{bmatrix} K^t$$

Now K=RLR where R is the (symmetric) 4-point bit-reversal permutation matrix, and L is the 4×4 lower diagonal matrix of ±1 and ±2 elements which arise from the coefficients in the iterative application of the angle addition formula for the cosine, c(2N+1)=2c(2N)c1−c(2N−1):

$$R = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

and $$L = \begin{bmatrix} 1 & 0 & 0 & 0 \\ -1 & 2 & 0 & 0 \\ 1 & -2 & 2 & 0 \\ -1 & 2 & -2 & 2 \end{bmatrix}.$$

Thus $$K = \begin{bmatrix} 1 & 0 & 0 & 0 \\ 1 & 2 & -2 & 0 \\ -1 & 0 & 2 & 0 \\ -1 & -2 & 2 & 2 \end{bmatrix}$$

This factoring provides a fast computation method for the second 4×4 matrix in terms of the 4-point 1-D IDCT matrix.

The foregoing 8-point de-interlacing IDCT applies in the fast, drift-free preferred embodiment transcoder of section 6 as follows.

First, vertically downsample the B-frame frame-DCT blocks by top-field extraction from each 8×8 DCT block using the de-interlacing 1-D IDCT on each of the columns; this yields 8-column×4-row blocks having frequency-domain row index and spatial-domain column index.

Next, perform horizontal downsampling by one of the following two preferred embodiment methods:

(1) averaging the even- and odd-polyphase components of each of the four top-field rows by first applying an 8-point 1-D IDCT to each of the four top-field rows to convert to spatial-domain column index and then averaging the even- and odd-polyphase components to yield the downsampled 4×4 in the spatial domain, or (2) eliminating the odd-polyphase component of each of the four top-field rows by applying the de-interlacing 1-D IDCT to each of the four top-field rows to yield the downsampled 4×4 in the spatial domain. As mentioned in section 6, the second method is faster but may produce slightly perceptible artifacts around sharp vertical edges.

More explicitly, let Z denote an 8×8 frame-DCT of 8×8 spatial block X which may be either a block of pixels (intra-coded) or a block of prediction errors (inter-coded). Then the overall downsampling is:

(a) For B-frames: first apply the de-interlacing 1-D IDCT with respect to the row index to each of the columns of Z to extract $M_e$, the 8-column×4-row top-field of X but still with column index still in the frequency domain:

$$m^k_e = T^t(4)z^k_p + QT^t(4)K^t z^k_r, \text{ for } k=0, 1, \ldots, 7$$

where k is the column index. 8×8 Z is the interlace of 8×4 $Z_p$ and 8×4 $Z_r$ after reverse bit-ordering, $Z_p = [z^0_p, \ldots, z^7_p]$, $Z_r = [z^0_r, \ldots, z^7_r]$, and $M_e = [m^0_e, \ldots, m^7_e]$.

(b) Next, for method (1) first apply 8-point 1-D IDCT to each of the rows of 8×4 $M_e$ to yield 8×4 top field $X_e$, and then average pairs of pixels in the rows to yield the 4×4 downsampling of X.

For method (2) for each of the four rows of 8×4 $M_e$, apply the de-interlacing 1-D IDCT with respect to the column index to directly yield the 4×4 downsampling of X:

$$x^k_{4 \times 4} = T^t(4)n^k_p + QT^t(4)K^t n^k_r, \text{ for } k=0, 1, 2, 3$$

where $n^k_p$ and $n^k_r$ are the bit-reverse ordered even- and odd-polyphases of $n^k$ which is the transpose of the $k^{th}$ row of $M_e$ and $x^k_{4 \times 4}$ is the transpose of the kth row of $X_{4 \times 4}$.

8. Multi-Format Transcoder

In applications such as video streaming, content is usually available in the MPEG-2 interlaced format. However, each end-user may demand that his/her video streams should be delivered to him/her in one of several available standards such as MPEG-4, H.263, Windows Media Player, or Real Video. To support this requirement, a multi-format transcoder that can convert an MPEG-2 bitstream into a user-specified standard is critical. This section explains how to efficiently implement a multi-format transcoder based on the foregoing Fast, Drift-Free (FDF) transcoder in section 6. The multi-format transcoder needs an MPEG-2 decoder and separate encoders for each standard that the end-user may demand. Thus, first modify the MPEG-2 decoder so that it provides de-interlaced, spatially-downsampled raw frames with associated motion-vector information as described in section 6 and shown in FIG. 6. The required modifications are listed below.

1. Replace the 2-D IDCT stage of the MPEG-2 decoder with the Downsample-IDCT stage used in the fast drift-free transcoder of sections 6-7.

2. Modify the MPEG-2 decode MC stage so that it motion compensates horizontally-downsampled I-/P-frames. For B-frames, perform motion compensation on the horizontally-downsampled top field only. After B-frame motion compensation, discard the bottom fields of the associated anchor I-/P-frames.

3. Use one of the methods in Section 2 to estimate motion-vectors for the downsampled frames. After modifying the MPEG-2 decoder as described above, the ME stage is eliminated from each of the available encoders and replaced with code that re-uses the estimated motion vectors provided by the modified MPEG-2 decoder. To operate the multi-format transcoder, feed the input content to the modified MPEG-2 decoder that now outputs de-interlaced, spatially-downsampled, raw frames along with estimated motion-vectors. Then input the frames and motion vectors to the appropriate, user-specified encoder that outputs the transcoded bitstream in the user-specified standard. Incorporating the transcoding algorithms in the decoder implementation thus provides fast, drift-free multi-format transcoding.

While the foregoing is directed to embodiments of the present invention, other and further embodiments of the invention may be devised without departing from the basic scope thereof, and the scope thereof is determined by the claims that follow.

What is claimed is:

1. An apparatus for transcoding, comprising:
   (a) means for receiving encoded motion-compensated video including motion vectors and frame-DCT blocks;
   (b) means for downsampling said blocks, comprising means for:
      (i) for an I-picture or P-picture DCT block, applying a two-dimensional inverse discrete cosine transform (IDCT) and then applying a downsampling with respect to the horizontal dimension;
      (ii) for a B-picture DCT block, applying a one-dimensional de-interlacing IDCT with respect to the vertical dimension of said block and then applying a one-dimensional IDCT and a downsampling with respect to the horizontal dimension;
   (c) mean for applying inverse motion compensation from results from step (b);
   (d) mean for applying a downsampling with respect to the vertical dimension for the results of step (b)(i);
   (e) mean for repeating steps (a)-(d) for further DCT blocks and motion vectors;
   (f) mean for encoding the results of step (e).

2. The method of claim 1, wherein:
   (a) said inverse motion compensation of step (c) of claim 1 includes re-use of said motion vectors.

3. The method of claim 1, wherein:
   (a) said inverse motion compensation of step (c) of claim 1 includes use of a field of the results of step (b)(i).

4. The method of claim 1, wherein:
   (a) said mean for encoding of step (f) of claim 1 comprises mean for re-use of said motion vectors.

5. The method of claim 1, wherein:
   (a) said received pictures are encoded with variable-length coding; and
   (b) prior to said downsampling of step (b) of claim 1, a mean for applying variable-length decoding is utilized.

6. An apparatus for transcoding, comprising:
   (a) means for receiving encoded motion-compensated video including motion vectors and frame-DCT blocks;
   (b) means for downsampling said blocks, comprising means for:
      (i) for an I-picture or P-picture DCT block, applying a two-dimensional inverse discrete cosine transform (IDCT) and then applying a downsampling with respect to the horizontal dimension;
      (ii) for a B-picture DCT block, applying a one-dimensional de-interlacing IDCT with respect to the row dimension of said block and applying a one-dimensional de-interlacing IDCT with respect to the column dimension;
   (c) means for applying inverse motion compensation for results from step (b);
   (d) means for applying a downsampling with respect to the vertical dimension for the results of step (b)(i);
   (e) means for repeating steps (a)-(d) for further DCT blocks and motion vectors;
   (f) means for encoding the results of step (e).

7. The method of claim 6, wherein:
   (a) said inverse motion compensation of step (c) of claim 6 includes re-use of said motion vectors.

8. The method of claim 6, wherein:
(a) said inverse motion compensation of step (c) of claim 6 includes use of a field of the results of step (b)(i).

9. The method of claim 6, wherein:
(a) said encoding of step (f) of claim 6 includes re-use of said motion vectors.

10. The method of claim 6, wherein:
(a) said received pictures are encoded with variable-length coding; and
(b) prior to said downsampling of step (b) of claim 6, applying variable-length decoding.

* * * * *